(12) United States Patent
Okamura (10) Patent No.: US 7,699,705 B2
(45) Date of Patent: Apr. 20, 2010

(54) CURSOR CONTROL APPARATUS AND CURSOR CONTROL PROGRAM

(75) Inventor: Noriaki Okamura, Minato-ku (JP)

(73) Assignee: Konami Corporation, Chiyodu-Ku, Tokyo (JP)

( * ) Notice: Subject to any disclaimer, the term of this patent is extended or adjusted under 35 U.S.C. 154(b) by 1177 days.

(21) Appl. No.: 10/786,590

(22) Filed: Feb. 26, 2004

(65) Prior Publication Data

US 2004/0207602 A1 Oct. 21, 2004

(30) Foreign Application Priority Data

Apr. 15, 2003 (JP) ............................. 2003-110759

(51) Int. Cl.
*A63F 13/00* (2006.01)
*A63F 9/24* (2006.01)

(52) U.S. Cl. .................... 463/37; 345/145; 345/156; 345/157

(58) Field of Classification Search .............. 463/4–7, 463/30–34, 49, 37; 345/145, 156, 157
See application file for complete search history.

(56) References Cited

U.S. PATENT DOCUMENTS

| | | | |
|---|---|---|---|
| 4,987,411 A | | 1/1991 | Ishigami |
| 5,315,313 A | * | 5/1994 | Shinagawa .................. 345/159 |
| 5,359,347 A | * | 10/1994 | Kim et al. ................... 715/857 |
| 5,398,044 A | * | 3/1995 | Hill ............................ 715/857 |
| 5,477,236 A | * | 12/1995 | Nanbu ........................ 715/858 |
| 5,596,347 A | * | 1/1997 | Robertson et al. ........... 715/856 |
| 5,598,183 A | * | 1/1997 | Robertson et al. ........... 715/856 |
| 5,774,111 A | * | 6/1998 | Lecland et al. .............. 715/856 |
| 5,784,052 A | * | 7/1998 | Keyson ...................... 345/167 |
| 5,815,138 A | | 9/1998 | Tsubaki et al. |
| 6,057,826 A | * | 5/2000 | Gaultier et al. ............. 345/157 |
| 6,084,574 A | * | 7/2000 | Bidiville .................... 345/166 |
| 6,166,718 A | * | 12/2000 | Takeda ....................... 715/856 |

(Continued)

FOREIGN PATENT DOCUMENTS

JP 09-016370 A 1/1997

(Continued)

OTHER PUBLICATIONS

"Methodology for Marking Objects Using a Polar Coordinate Point and Shoot Cursor." IBM Corp., New York, NY, vol. 35, No. 6, Nov. 1, 1992, XP000314154 ISSN: 0018-8689, pp. 310-311.

(Continued)

*Primary Examiner*—Robert E Pezzuto
*Assistant Examiner*—Ryan Hsu
(74) *Attorney, Agent, or Firm*—Buchanan Ingersoll & Rooney PC (57) ABSTRACT

First, the coordinate position on a game screen of each point is calculated (S501). Then, a path which circulates through the coordinate positions (or their vicinities) of all the points is obtained (S502). A line segment is drawn to extend from the barycentric position of the points in a direction corresponding to an input direction, and the coordinate position of the intersection point of the obtained line segment and the path is calculated as a position on the path through which a cursor passes (S503). Finally, the image of the cursor is moved to the calculated intersection point coordinate position and is displayed (S504).

13 Claims, 7 Drawing Sheets

U.S. PATENT DOCUMENTS

| | | | |
|---|---|---|---|
| 6,257,983 B1 * | 7/2001 | Rimoto | 463/38 |
| 6,280,323 B1 * | 8/2001 | Yamazaki et al. | 463/4 |
| 6,486,470 B2 * | 11/2002 | Huang | 250/307 |
| 6,486,870 B1 * | 11/2002 | Kozu | 345/157 |
| 2004/0017355 A1 * | 1/2004 | Shim | 345/157 |

FOREIGN PATENT DOCUMENTS

| | | |
|---|---|---|
| JP | 2002-157082 A | 5/2002 |
| JP | 2003-000952 A | 1/2003 |
| JP | 2003-91362 A | 3/2003 |

OTHER PUBLICATIONS

European Search Report issued Nov. 10, 2008 in European Patent Application No. 04004231.9-2224/1469379.

* cited by examiner

CURSOR CONTROL APPARATUS AND CURSOR CONTROL PROGRAM

FIELD OF THE INVENTION

The present invention relates to a technique for controlling a cursor.

BACKGROUND OF THE INVENTION

A cursor is generally used to point a desired item out of several items displayed on a display screen of, e.g., a CRT or liquid crystal screen. More specifically, a cursor is displayed on a display screen and is moved using a pointing device such as a mouse. Since the cursor is moved to a desired position, and a predetermined operation (e.g., an operation such as a click) is performed, a desired item can be pointed.

In some games, it is necessary to point a desired item out of several items on a game screen. These games include a game in which several spots (these "spots" are not explicitly displayed on a display screen) each of which generates an event upon pointing are set in the game space as a three-dimensional virtual space, and the spots are searched for on the screen.

In games as well, a cursor is generally displayed on a game screen for use in pointing such a spot. Devices operated by a player to change the display position of the cursor include a cross key, joystick, and the like. When each direction key component of a cross key is pressed, the cursor moves in the direction indicated by the direction key component. When a joystick is tilted, the cursor moves in the direction in which the stick is tilted.

In some games, the position of a spot of this kind dynamically changes in a game screen. In this case, it is burdensome for a player to move the position of a cursor using, e.g., a cross key or joystick while following the position of the moving spot.

Even when the spots are stationary in the game screen, it is also burdensome for the player to align the cursor with the position of the spot using the cross key or joystick.

SUMMARY OF THE INVENTION

The present invention has been made in consideration of the above-mentioned problems, and has as its object to provide a technique which enables a player to easily control a cursor.

In order to achieve the object of the present invention, for example, a cursor control apparatus according to the present invention has the following arrangement.

That is, there is provided a cursor control apparatus which performs cursor control for moving a cursor displayed on a display screen of a display device to a coordinate position of one of a plurality of points visibly or invisibly set in the display screen in accordance with a designation indicating a moving direction of the cursor in the display screen, comprising:

path calculation means for calculating a path which circulates through vicinities of positions of the points on the basis of coordinate positions of the points in the display screen;

intersection point coordinate position calculation means for calculating a coordinate position of an intersection point of the path and a line segment extending from a predetermined coordinate position in a region surrounded by the path calculated by the path calculation means in the moving direction of the cursor indicated by the designation; and display control means for moving a display position of the cursor to the calculated intersection point coordinate position.

In order to achieve the object of the present invention, for example, a cursor control program according to the present invention has the following arrangement.

That is, there is provided a cursor control program for causing a computer to perform cursor control for moving a cursor displayed on a display screen of a display device of the computer to a coordinate position of one of a plurality of points visibly or invisibly set in the display screen in accordance with a designation indicating a moving direction of the cursor in the display screen, wherein the program causes the computer to perform:

a path calculation step of calculating a path which circulates through vicinities of positions of the points on the basis of coordinate positions of the points in the display screen;

an intersection point coordinate position calculation step of calculating a coordinate position of an intersection point of the path and a line segment extending from a predetermined coordinate position in a region surrounded by the path calculated in the path calculation step in the moving direction of the cursor indicated by the designation; and a display control step of moving a display position of the cursor to the calculated intersection point coordinate position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
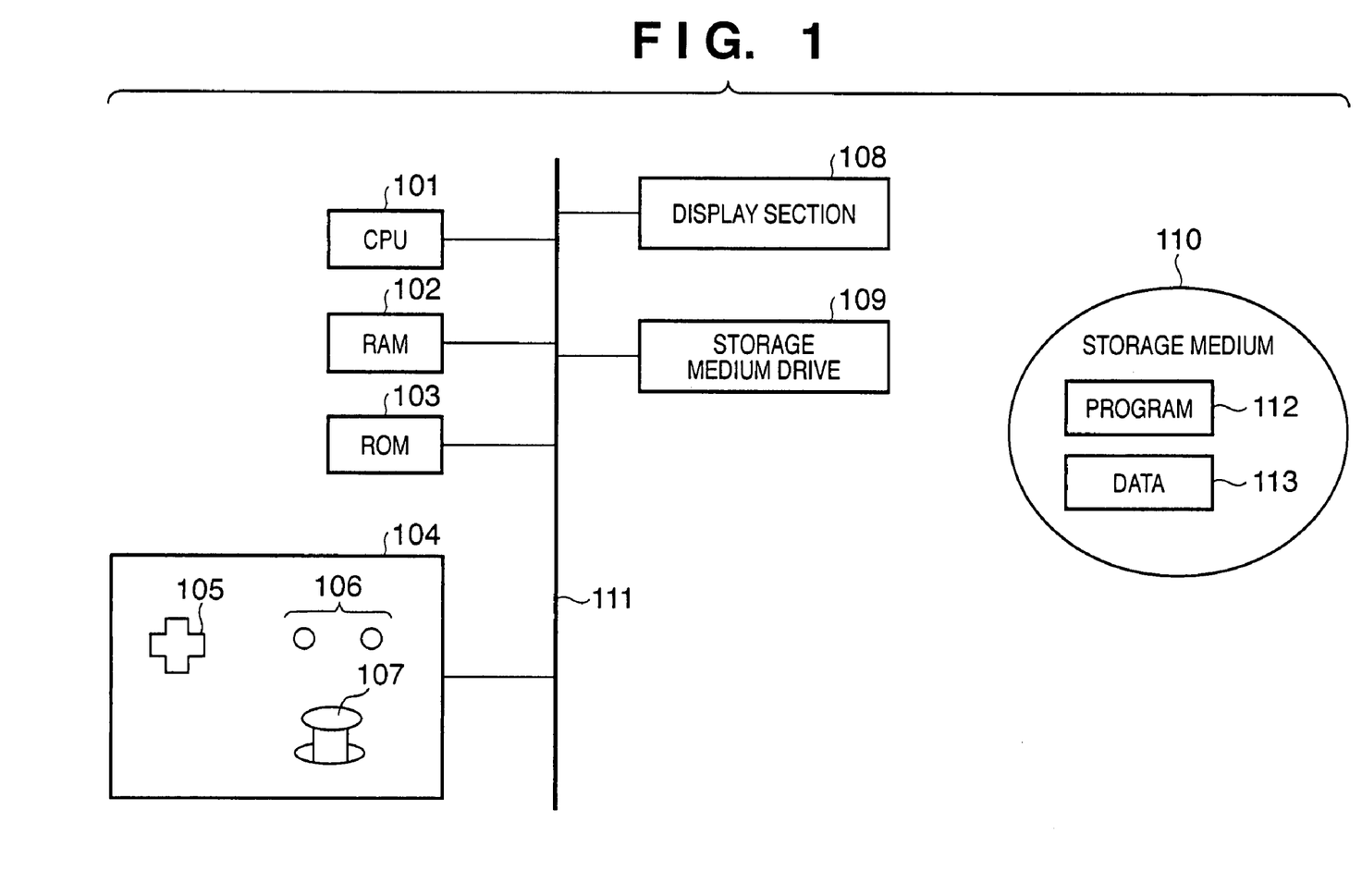
FIG. 1 is a view showing the basic arrangement of a game apparatus according to the first embodiment of the present invention.

FIG. 1 is a view showing the basic arrangement of a game apparatus according to this embodiment. Reference numeral 101 denotes a CPU which controls the entire apparatus using a program and data loaded into a RAM 102 and additionally executes a game process including a cursor control process (to be described later).

Reference numeral 102 denotes the RAM which has an area for temporarily storing a program 112 or data 113 loaded from a storage medium 110 by a storage medium drive 109 in accordance with control by the CPU 101 and additionally a work area necessary for the CPU 101 to execute various processes.

Reference numeral 103 denotes a ROM which stores a program and data for starting up and controlling the entire apparatus. Reference numeral 104 denotes an input apparatus main body which is intended for use by the player in inputting various instructions for playing a game. The input apparatus main body 104 has a cross key 105, buttons 106, and a stick 107. The player can input various instructions using these components. Note that this embodiment employs the stick 107 to issue instructions for moving a cursor. The details of the instructions will be described later.

Reference numeral 108 denotes a display section 108 which comprises a CRT, liquid crystal screen, or the like and makes various displays including a display that pertains to a game. Reference numeral 109 denotes the storage medium drive 109 which reads the program 112 or data 113 stored in the storage medium 110 such as a CD-ROM or DVD-ROM in accordance with instructions from the CPU 101 and outputs it to the RAM 102. Reference numeral 111 denotes a bus which connects the above-mentioned sections.

A case will be exemplified wherein a cursor control method (according to this embodiment) to be performed in a game apparatus having the above arrangement is applied to a game (to be described later).

Figure 2:
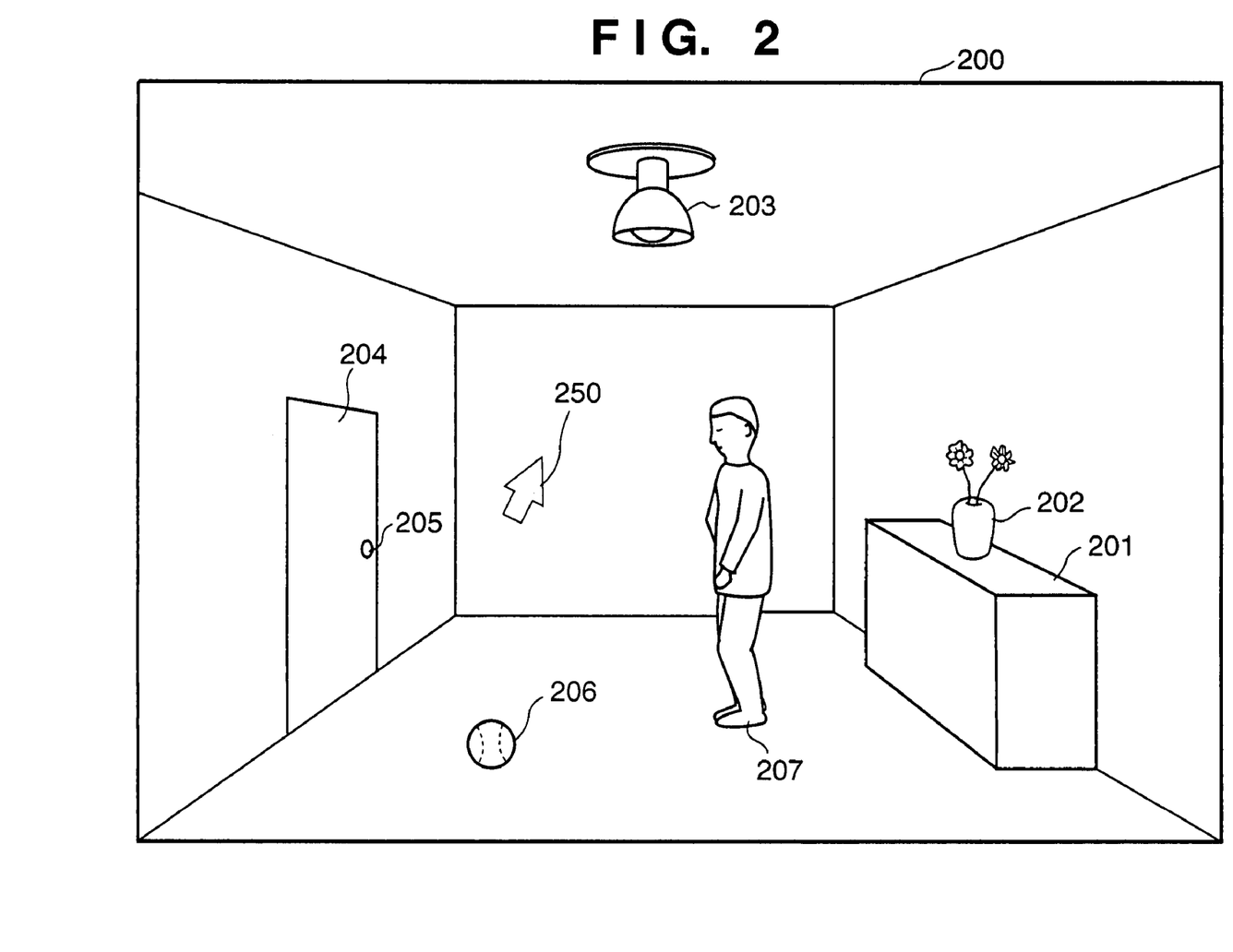
FIG. 2 is a view showing an example of a screen display of a game which uses a cursor control method according to the first embodiment of the present invention.

FIG. 2 is a view showing an example of a screen display of a game which uses the cursor control method according to this embodiment. A screen 200 shown in FIG. 2 is generated by the CPU 101 in accordance with a program or data which is loaded by the storage medium drive 109 from the storage medium 110 into the RAM 102 and is displayed on a display screen of the display section 108.

The game screen 200 of FIG. 2 contains images which exist in a three-dimensional virtual space set as a game space. The images include an image of a sideboard 201, an image of a vase 202 placed on the sideboard, an image of a lighting fixture 203 hanging from the ceiling in the game space, an image of a door 204 formed in a wall in the game-space, an image of a doorknob 205 fixed to the door 204, an image of a ball 206 lying on the floor in the game space, and an image of a person 207 standing on the floor. An image of a cursor 250 is also displayed on the game screen 200.

A plurality of spots are set in the screen 200, and each spot generates an event upon pointing using the cursor 250. For example, assume that such a "spot" is set at the display position of the image of the person 207. When the cursor 250 is moved to the display position by an operation (to be described later) using the stick 107 to issue instructions by, e.g., pressing the buttons 106, an "event" occurs such that "lines" uttered by the person 207 are displayed on the screen 200. Generation of this event makes a game story develop. That is, a player enjoys locating a "spot" of this kind in the screen 200 to generate a corresponding event for making a game story develop.

This "spot" will be referred to as a "point" hereinafter. In this embodiment, points are set at the display positions of respective objects (in FIG. 2, the vase 202, lighting fixture 203, doorknob 205, ball 206, and person 207). More specifically, the layout positions of the vase 202, lighting fixture 203, doorknob 205, ball 206, and person 207, all of which are indicated by three-dimensional coordinates in the game space, are projected onto a projection plane (a known plane prepared in advance to generate a game screen viewed from the player's viewpoint). The projected positions are assumed to be the coordinate positions of the points for the respective objects.

The position of each point in the screen 200 changes due to a change in position of the point of view or direction of the line of sight of the player, a change in position in the game space of the object corresponding to the point, or the like. For this reason, a process of calculating the position of each point on the screen 200 is performed sequentially.

Figure 3:
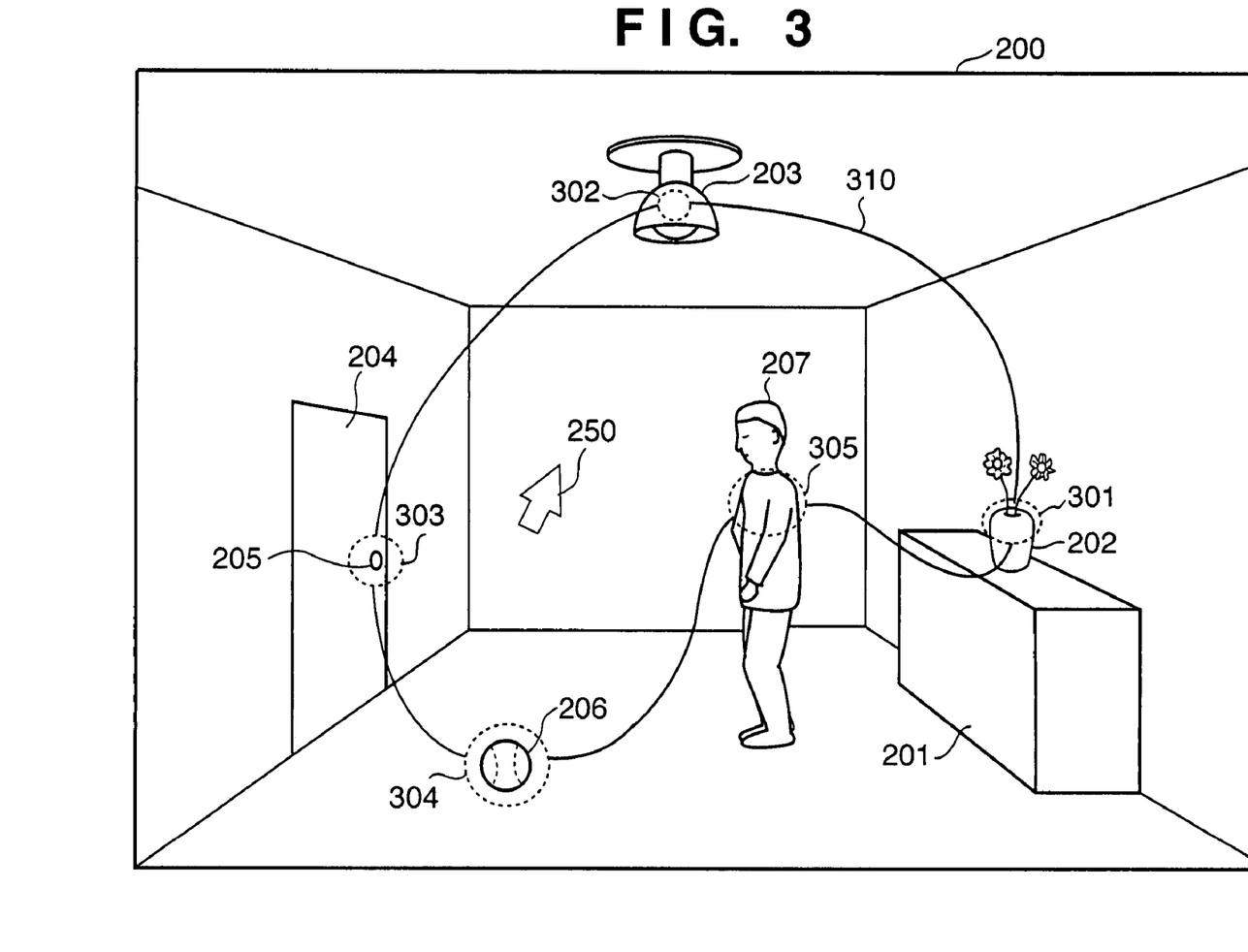
FIG. 3 is a view explicitly showing the points set for respective objects in a game screen 200 shown in FIG. 2.

FIG. 3 is a view explicitly showing the points set for the respective objects in the screen 200 shown in FIG. 2. In FIG. 3, regions 301 to 305 indicated by dotted circles show points, respectively. The region 301 shows a point set for the vase 202; the region 302, the lighting fixture 203; the region 303, the doorknob 205; the region 304, the ball 206; and the region 305, the person 207. The sizes of the regions may be the same or different from each other.

In FIG. 3, the points are explicitly shown to explain them. However, as the player wants to locate a point to generate a corresponding event in this game, as described above, points are not explicitly (invisibly) displayed in an actual game.

In FIG. 3, reference numeral 310 denotes a path which circulates through the coordinate positions of the points (301 to 305). The cursor 250 is always displayed at any position on the path 310 and moves along the path 310 by operating the stick 107 (to be described later). This makes it possible to reliably move the cursor 250 to the coordinate position of each point on the path. Note that in this embodiment, the path 310 is not explicitly displayed, similarly to the points described above.

To obtain a "path which circulates through the coordinate positions of points", for example, the barycentric positions of the points are calculated using the coordinate positions of the points, and the coordinate position of each point is searched for clockwise (or counterclockwise) from the calculated barycentric position. A process of obtaining a path (partial path) which connects a found coordinate position and the following found coordinate position is performed for each point. With this operation, the path which circulates through the coordinate positions of all the points can be obtained.

This "path which circulates through the coordinate positions of the points" may be created using a spline curve, Bezier curve, or the like or partial paths of that may be created as line.

The coordinates (or the points themselves) of some points may dynamically change or the number of points in the screen may dynamically change. In these cases, the shape of the path may change or the path may pass through different positions. For this reason, a process of obtaining the path is performed sequentially. The "path which circulates through the coordinate positions of the points" need not exactly pass through the coordinate positions of the points and may pass through "positions near the respective coordinate positions".

Since the points and path are not explicitly displayed, as described above, the pleasure of locating points in the screen can be left over. Also, since the cursor is made to move along the path, the cursor can reliably be moved to the coordinate position of each point on the path. Accordingly, even when it is difficult to point each point (e.g., when the coordinate position of the point dynamically changes in the screen), the cursor can reliably be moved to the coordinate position (or its vicinity) of the point. This can suppress burdens on a player who operates to move the cursor.

Next, a method of moving the cursor 250 to the display position of a desired point using the stick 107 will be described.

Figure 6A:
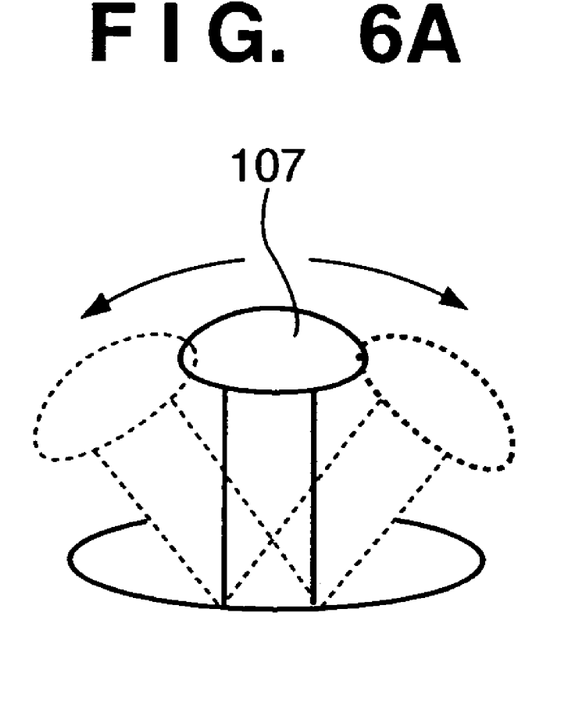
FIG. 6A is a side view showing how a stick 107 can be moved.
Figure 6B:
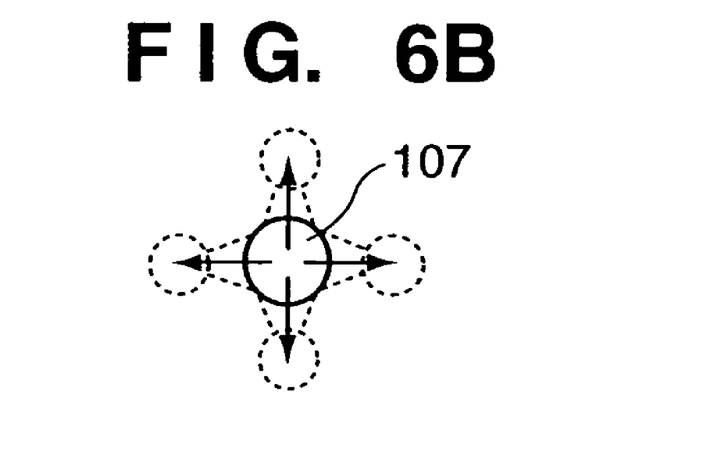
FIG. 6B is a top view showing how the stick 107 can be moved.

FIG. 6 is view for explaining operation of the stick 107. FIG. 6A is a side view showing how the stick 107 can be moved; and FIG. 6B, a top view showing how the stick 107 can be moved. As shown in FIGS. 6A and 6B, the stick 107 is perpendicular (the stick indicated by a solid line) to the input apparatus main body 104 when not in use by a player. The stick 107 can be tilted (the sticks each indicated by a dotted line) in a desired direction (the direction indicated by each arrow in FIG. 6A) by the player's operation. The stick has the same properties as those of a general joystick. In FIG. 6B, the number of directions in which the stick can be tilted is four. However, the present invention is not limited to this. The number may be set to more than four.

When the stick 107 is tilted in a desired direction, the input apparatus main body 104 detects the direction in which the stick 107 is tilted, and sends to the CPU 101 a signal indicating the detected direction. For example, in FIG. 6B, when the stick 107 is tilted in the left direction with respect to the sheet surface of FIG. 6B, the input apparatus main body 104 detects that the stick 107 is tilted in the left direction and notifies the CPU 101 to that effect.

Figure 7A:
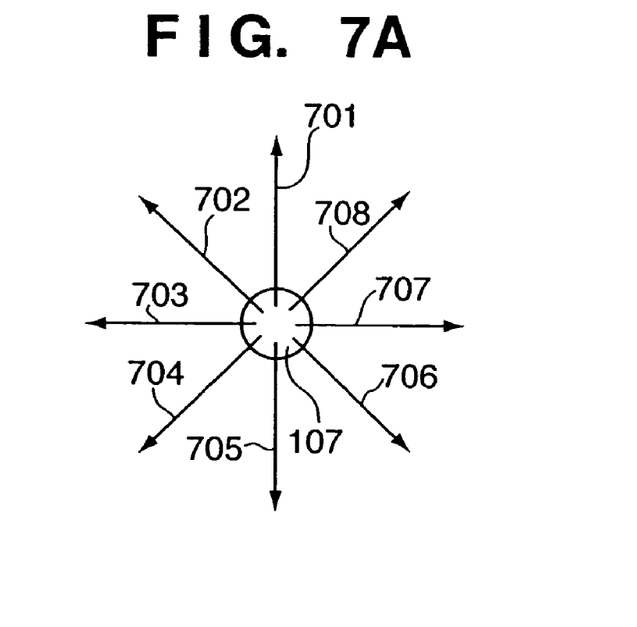
FIG. 7A is view showing the directions in which the stick 107 is tilted and the corresponding moving directions of a cursor.
Figure 7B:
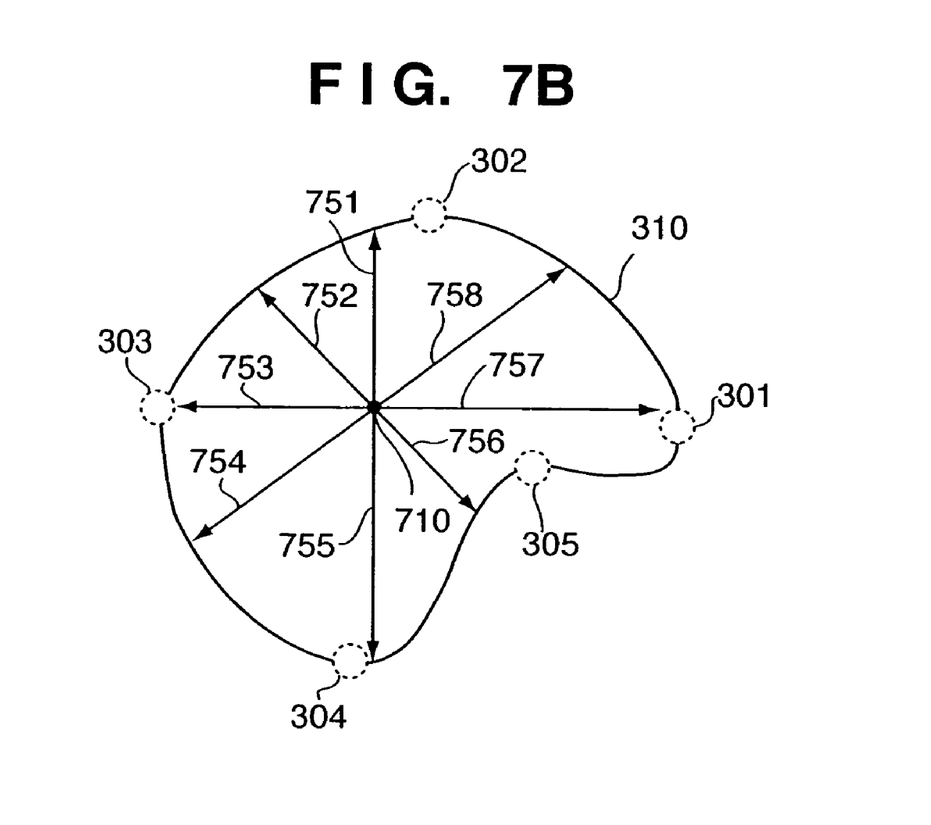
FIG. 7B is view showing the directions in which the stick 107 is tilted and the corresponding moving directions of a cursor.

Control of the cursor 250 using the stick 107 will be described with reference to FIG. 7. FIGS. 7A and 7B are views showing the directions in which the stick 107 is tilted, and the corresponding moving directions of the cursor, respectively. In FIG. 7B, reference numerals 301 to 305 denote the points shown in FIG. 3, respectively. Reference numeral 710 denotes the barycentric position of all the points 301 to 305.

When the stick 107 is tilted in the direction indicated by 701, the input apparatus main body 104 detects this and notifies the CPU 101 of the direction in which the stick 107 is tilted. The CPU 101 calculates the coordinate position of the intersection point of the path 310 and a line segment 751 extending from the barycentric position 710 in a direction corresponding to the direction in which the stick 107 is tilted, and moves the display position of the cursor to the calculated intersection point coordinate position.

When the stick 107 is tilted in the direction indicated by 702, the input apparatus main body 104 detects this and notifies the CPU 101 of the direction in which the stick 107 is tilted. The CPU 101 detects this, calculates the coordinate position of the intersection point of the path 310 and a line segment 752 extending from the barycentric position 710 in a direction corresponding to the direction in which the stick 107 is tilted, and moves the display position of the cursor to the calculated intersection point coordinate position.

When the stick 107 is tilted in the direction indicated by 703, the input apparatus main body 104 detects this and notifies the CPU 101 of the direction in which the stick 107 is tilted. The CPU 101 detects this, calculates the coordinate position of the intersection point of the path 310 and a line segment 753 extending from the barycentric position 710 in a direction corresponding to the direction in which the stick 107 is tilted, and moves the display position of the cursor to the calculated intersection point coordinate position.

When the stick 107 is tilted in the direction indicated by 704, the input apparatus main body 104 detects this and notifies the CPU 101 of the direction in which the stick 107 is tilted. The CPU 101 detects this, calculates the coordinate position of the intersection point of the path 310 and a line segment 754 extending from the barycentric position 710 in a direction corresponding to the direction in which the stick 107 is tilted, and moves the display position of the cursor to the calculated intersection point coordinate position.

When the stick 107 is tilted in the direction indicated by 705, the input apparatus main body 104 detects this and notifies the CPU 101 of the direction in which the stick 107 is tilted. The CPU 101 detects this, calculates the coordinate position of the intersection point of the path 310 and a line segment 755 extending from the barycentric position 710 in a direction corresponding to the direction in which the stick 107 is tilted, and moves the display position of the cursor to the calculated intersection point coordinate position.

When the stick 107 is tilted in the direction indicated by 706, the input apparatus main body 104 detects this and notifies the CPU 101 of the direction in which the stick 107 is tilted. The CPU 101 detects this, calculates the coordinate position of the intersection point of the path 310 and a line segment 756 extending from the barycentric position 710 in a direction corresponding to the direction in which the stick 107 is tilted, and moves the display position of the cursor to the calculated intersection point coordinate position.

When the stick 107 is tilted in the direction indicated by 707, the input apparatus main body 104 detects this and notifies the CPU 101 of the direction in which the stick 107 is tilted. The CPU 101 detects this, calculates the coordinate position of the intersection point of the path 310 and a line segment 757 extending from the barycentric position 710 in a direction corresponding to the direction in which the stick 107 is tilted, and moves the display position of the cursor to the calculated intersection point coordinate position.

When the stick 107 is tilted in the direction indicated by 708, the input apparatus main body 104 detects this and notifies the CPU 101 of the direction in which the stick 107 is tilted. The CPU 101 detects this, calculates the coordinate position of the intersection point of the path 310 and a line segment 758 extending from the barycentric position 710 in a direction corresponding to the direction in which the stick 107 is tilted, and moves the display position of the cursor to the calculated intersection point coordinate position.

In the above-mentioned manner, the CPU 101 calculates a line segment extending from the barycentric position 710 in a direction corresponding to the direction in which the stick 107 is tilted, calculates an intersection point coordinate position of the obtained line segment and the path, and moves the display position of the cursor to the calculated intersection point coordinate position.

Note that if the number of directions in which the stick 107 can be tilted, i.e., the number of directions which the input apparatus main body 104 can detect increases, the cursor 250 can be moved along the path in finer steps.

In actually performing the above-mentioned cursor control method, if line segments are set from the barycentric position (in other words, the barycentric position in a closed region surrounded by the obtained path) to each point, it is needed so as to avoid a situation wherein two or more points are located on one line segment. If two or more points are located on one line segment, the coordinate positions of these points are moved slightly such that they are not located on the same line segment (precondition).

Figure 4:
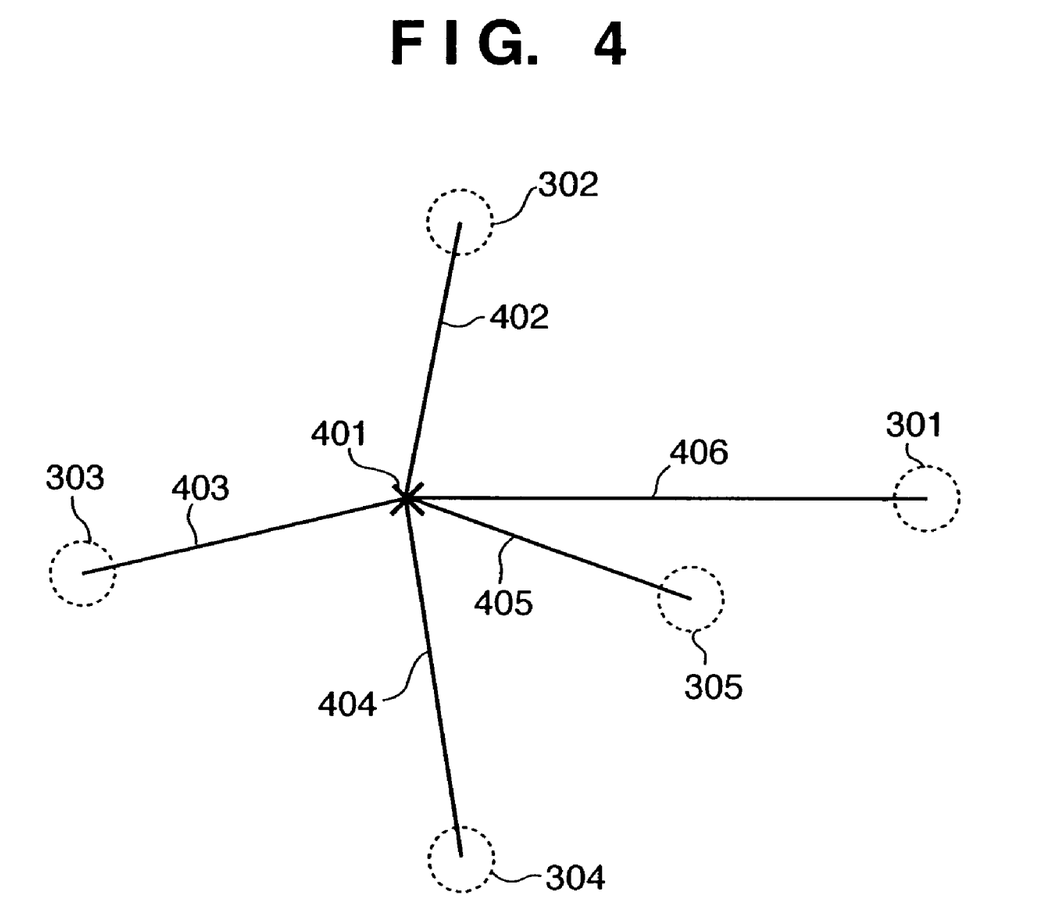
FIG. 4 is a view for explaining a precondition.

FIG. 4 is a view for explaining the precondition. Reference numerals 301 to 305 denote the points in FIG. 3, respectively. In FIG. 4, when line segments 402 to 406 are set from a barycentric position 401 to the points, respectively, no line segment has two or more points. For example, assume that two or more points are located on the line segment 402. When the cursor is to be moved toward the line segment 402, the point to which the cursor should be moved is not uniquely determined. Thus, the precondition always needs to be met.

Figure 5:
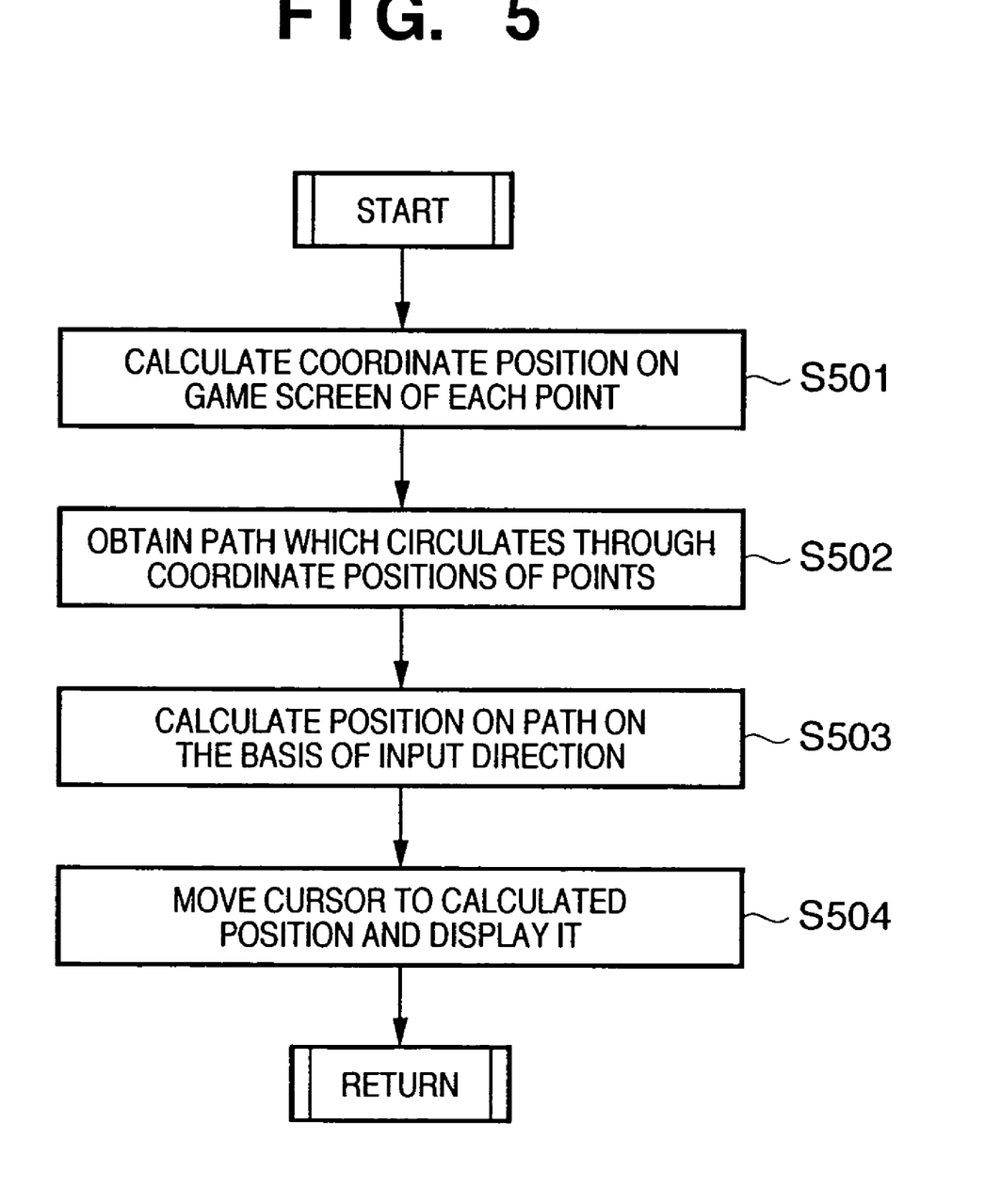
FIG. 5 is a flow chart of a cursor control process to be executed as a subroutine in the game.

FIG. 5 is a flow chart of a cursor control process to be executed as a subroutine in the game. The program according to the flow chart of FIG. 5 is included in the program 112 stored in the storage medium 110 and is loaded into the RAM 102 by the storage medium drive 109. Execution of the program 112 by the CPU 101 causes the game apparatus according to this embodiment to perform a cursor control process (to be described later). Note that the processes in steps are described above and will be explained briefly.

First, the coordinate position on the game screen of each point is calculated (step S501). More specifically, as described above, the three-dimensional coordinate positions of the objects for which points are set are projected onto a projection plane to obtain resultant positions. The obtained positions are assumed to be the coordinate positions of the points. This process is performed for each of all the points in the screen. With this operation, the coordinate position of each point can be calculated.

A path which circulates through the coordinate positions (or their vicinities) of all the points is obtained (step S502). More specifically, as described above, for example, the barycentric position of the points is calculated using the coordinate positions of the points, and the coordinate position of each point is searched for clockwise (or counterclockwise) from the calculated barycentric position. A process of obtaining a path (partial path) which connects a found coordinate position and the following found coordinate position is performed for each point. With this operation, the path which circulates through the coordinate positions of all the points can be obtained.

A position on the path through which the cursor passes is calculated in accordance with the direction which is imparted from the input apparatus main body 104 and in which the stick 107 is tilted (step S503). More specifically, as described above, a line segment is calculated to extend from the barycentric position of the points in a direction corresponding to the direction in which the stick 107 is tilted, and the coordinate position of the intersection point of the obtained line segment and the path is calculated as the position on the path through which the cursor passes.

Finally, the image of the cursor is moved to the calculated intersection point coordinate position and is displayed (step S504). The above-mentioned process is performed every time the game screen is updated. When the process ends, the flow returns to the main process of the game.

As has been described above, the cursor control method according to this embodiment and the game apparatus which performs the cursor control method can suppress burdens on a player who operates to move a cursor.

Additionally, this embodiment has the following advantage. For example, assume that a plurality of items which can discretely be pointed are displayed in a game screen, and the position of a cursor discretely moves to the position of any one of the items. In a conventional method, the cursor moves relatively, and a desired item cannot be pointed by skipping several items. On the other hand, according to the cursor control method of this embodiment, the cursor moves absolutely. By simply tilting a stick in a direction of the display position of an item to be pointed with respect to the current display position of the cursor, the cursor can be moved near to the item.

In this embodiment, the stick 107 is used to move the cursor 250. The input interface for use in moving the cursor 250 is not limited to this, and the cross key 105 may be used. The input means should not be limited to any specific one.

In this embodiment, points are not explicitly displayed from the nature of the game which uses the cursor control method. Points may explicitly (visibly) be displayed depending on an object to which the cursor control method is applied.

Second Embodiment

The position of each point in a screen changes due to a change in position of the point of view or direction of the line of sight of a player, a change in position in a game space of the object corresponding to the point, or the like. In consideration of this, in the first embodiment, a process of calculating the coordinate position on a game screen of each point is performed sequentially. However, when the position in the game screen of each point is fixed, such a process can be omitted. More specifically, data of the fixed coordinate position of each point on the game screen may be retained in a RAM 102 or the like and may be used as needed.

Also, in the first embodiment, a "point" is a spot which generates an event in a game screen. The present invention is not limited to this. A point may be set at a "spot" which generates no event. In this case, such a point which generates no event is set at an appropriate position such that the point does not overlap the coordinate position of another point in the game screen and the above-mentioned precondition is met. With this arrangement, dummy points which generate no event are added, and it becomes more difficult for a player to locate a point which generates an event. This can increase the difficulty level of the game.

The definition of "cursor" in this specification should be interpreted in a sense broader than that described in the first embodiment. For example, in a game aimed at shooting characters appearing in a game screen, a mark is generally displayed at its coordinate position to help visually identify the target coordinate position in the game screen. Such a mark falls within the category of "cursor" in this specification. Additionally, in an application other than a game, a mouse cursor for pointing a desired item out of a plurality of menu items scattered in the screen falls within the category of "cursor" in this specification.

As described above, this specification defines "cursor" as an object which is displayed to point an arbitrary region in a screen and whose display position can be pointed by a player.

Third Embodiment

The above-mentioned process (e.g., a process according to a part or the whole of the flow chart shown in FIG. 5) is stored as a program in a storage medium such as a CD-R, ROM, DVD-ROM, MO, or the like, and the program stored in the storage medium is loaded (installed or copied) into a computer. With this operation, the CPU or MPU of the computer can execute the process according to the program. Since a storage medium storing the program can implement the present invention, the storage medium apparently falls within the scope of the present invention.

Assume that a computer is connected to a network such as the Internet, LAN, or the like, and a server apparatus is further connected to the network. When the server apparatus retains a program to be downloaded to the computer, it can be used as a means for supplying the program to the computer, like the above-mentioned storage medium. Accordingly, the server apparatus also falls within the scope of the present invention.

As has been described above, the present invention can provide a technique which enables a player to easily control a cursor.

As many apparently widely different embodiments of the present invention can be made without departing from the spirit and scope thereof, it is to be understood that the invention is not limited to the specific embodiments thereof except as defined in the claims.

What is claimed is:

1. A cursor control apparatus which performs cursor control for moving a cursor displayed on a display screen of a display device to a coordinate position of one of a plurality of points visibly or invisibly set in the display screen in accordance with a designation indicating a moving direction of the cursor in the display screen, comprising:

path calculation means for calculating a path which circulates through vicinities of positions of the points on the basis of coordinate positions of the points in the display screen, each of the points being associated with a respective object in an image displayed in the display screen;

intersection point coordinate position calculation means for calculating a coordinate position of an intersection point of the path and a line segment extending from a predetermined coordinate position in a region surrounded by the calculated path, said line segment extending in a direction corresponding to an input direction; and display control means for moving a display position of the cursor to the calculated intersection point coordinate position; and confining movement of the cursor thereafter along the calculated path, wherein vicinities of positions of the points are near the respective coordinate positions of the points.

2. The apparatus according to claim 1, wherein the coordinate positions of the points are obtained by projecting coordinate positions, which are represented in a three-dimensional coordinate system, of corresponding objects in a three-dimensional virtual space.

3. The apparatus according to claim 1, wherein the plurality of points include a point whose coordinate position in the display screen dynamically changes.

4. The apparatus according to claim 1, wherein when line segments are drawn from the predetermined coordinate position in the region surrounded by the path calculated by said path calculation means to the points, the points are arranged on the display screen so as to avoid a situation wherein two or more of the points are located on one of the line segments.

5. The apparatus according to claim 1, wherein said path calculation means searches for the coordinate positions of the points in a predetermined rotational direction around the predetermined coordinate position based on the coordinate positions of the points, and the path which circulates through all the points is obtained by performing a process of calculating a partial path which connects a found coordinate position and a next found coordinate position for each point.

6. The apparatus according to claim 5, wherein the partial path is represented by a curve.

7. The apparatus according to claim 5, wherein the partial path is represented by a line segment.

8. A computer readable medium containing a cursor control program for causing a computer to perform cursor control for moving a cursor displayed on a display screen of a display device of the computer to a coordinate position of one of a plurality of points visibly or invisibly set in the display screen in accordance with a designation indicating a moving direction of the cursor in the display screen, wherein the program causes the computer to perform:

a path calculation step of calculating a path which circulates through vicinities of positions of the points on the basis of coordinate positions of the points in the display screen, each of the points being associated with a respective object in an image displayed in the display screen;

an intersection point coordinate position calculation step of calculating a coordinate position of an intersection point of the path and a line segment extending from a predetermined coordinate position in a region surrounded by the calculated path, said line segment extending in a direction corresponding to an input direction; and a display control step of moving a display position of the cursor in the display screen to the calculated intersection point coordinate position, and confining movement of the cursor thereafter in the display screen along the calculated path;

wherein vicinities of positions of the points are near to the respective coordinate positions of the points.

9. A method for performing cursor control for moving a cursor displayed on a display screen of a display device to a coordinate position of one of a plurality of points visibly or invisibly set in the display screen in accordance with a designation indicating a moving direction of the cursor in the display screen, comprising:

calculating a path which circulates through vicinities of positions of the points on the basis of coordinate positions of the points in the display screen, each of the points being associated with a respective object in an image displayed in the display screen;

calculating a coordinate position of an intersection point of the path and a line segment extending from a predetermined coordinate position in a region surrounded by the calculated path, said line segment extending in a direction corresponding to an input direction; and moving a display position of the cursor in the display screen to the calculated intersection point coordinate position; and confining movement of the cursor thereafter in the display screen along the calculated path, wherein vicinities of positions of the points are near to the respective coordinate positions of the points.

10. The apparatus according to claim 1, wherein the points comprise a first point which has an event generated when the cursor overlaps the first point.

11. The apparatus according to claim 1, wherein the path calculation means calculates the path which circulates through vicinities of the positions of the points by:

calculating barycentric position of the points using the coordinate positions of the points;

searching each of the points based on the coordinate positions of the points from the calculated barycentric position;

connecting a newly found point through the searching to one or more points that are previously found through the searching.

12. The apparatus according to claim 11, wherein the connecting comprises connecting the newly found point to the one or more points that are previously found using a spline curve, Bezier curve, or a line.

13. The apparatus according to claim 1, wherein the points comprise a second point which does not have an event generated when the cursor overlaps the second point.

* * * * *